(12) United States Patent
Colmont et al.

(10) Patent No.: US 11,827,275 B2
(45) Date of Patent: Nov. 28, 2023

(54) ENGINE CRADLE FOR A MOTOR VEHICLE

(71) Applicant: ArcelorMittal, Luxembourg (LU)

(72) Inventors: Jean-Louis Colmont, Cergy Saint Christophe (FR); Thierry Derchu, Bar le Duc (FR); Sébastien Albeaux, La Neuville aux Bois (FR); Guillaume De Taillac, Chalons-en-Champagne (FR)

(73) Assignee: ARCELORMITTAL, Luxembourg (LU)

( * ) Notice: Subject to any disclaimer, the term of this patent is extended or adjusted under 35 U.S.C. 154(b) by 447 days.

(21) Appl. No.: 17/275,796

(22) PCT Filed: Sep. 12, 2019

(86) PCT No.: PCT/IB2019/057685
§ 371 (c)(1),
(2) Date: Mar. 12, 2021

(87) PCT Pub. No.: WO2020/053796
PCT Pub. Date: Mar. 19, 2020

(65) Prior Publication Data
US 2022/0055691 A1    Feb. 24, 2022

(30) Foreign Application Priority Data
Sep. 12, 2018   (WO) .................. PCT/IB2018/056970

(51) Int. Cl.
*B62D 21/11* (2006.01)
*B60K 5/12* (2006.01)

(52) U.S. Cl.
CPC ................ *B62D 21/11* (2013.01); *B60K 5/12* (2013.01)

(58) Field of Classification Search
CPC .................................. B62D 21/11; B60K 5/12
See application file for complete search history.

(56) References Cited

U.S. PATENT DOCUMENTS

2012/0319389 A1* 12/2012 Takahashi .............. B62D 21/11
                                                        280/781
2017/0057550 A1*  3/2017 Sasaki ................... B62D 21/11
(Continued)

FOREIGN PATENT DOCUMENTS

DE        102016118952 A1    4/2018
EP            2619069 A1    7/2013
(Continued)

OTHER PUBLICATIONS

Search Report for PCT/IB2019/057685.
Search Report for PCT/IB2018/056970.

*Primary Examiner* — Erez Gurari
(74) *Attorney, Agent, or Firm* — Davidson, Davidson & Kappel, LLC

(57) ABSTRACT

A support device (1) of an engine support structure (2) of a motor vehicle includes at least a support part (4), comprising an upper face (10) and a lower face (12) defining between them a hollow volume (14), and at least one fixation device (8) intended to attach the support part to a vehicle body. The fixation device (8) comprises a fixation part (16) and a base part (18) extending at least partially inside the hollow volume (14) of the support part (4), at least a portion of the upper face (10) and at least a portion of the lower face (12) being applied against at least a portion of the base part (18) on either side of said base part (18. The fixation part (16) and the base part (18) are formed of at least two distinct parts attached together.

14 Claims, 5 Drawing Sheets

(56) References Cited

U.S. PATENT DOCUMENTS

| | | | |
|---|---|---|---|
| 2017/0174065 A1* | 6/2017 | Bujak | B60K 5/1216 |
| 2018/0086578 A1* | 3/2018 | Pugh | B62D 21/11 |
| 2018/0281860 A1* | 10/2018 | Tanaka | B60G 3/20 |
| 2019/0185060 A1* | 6/2019 | Gündogan | B62D 21/11 |
| 2020/0376946 A1* | 12/2020 | Kuwahara | B62D 21/11 |
| 2021/0379976 A1* | 12/2021 | Schantl | B60K 5/1241 |
| 2023/0070828 A1* | 3/2023 | Mizokane | B62D 35/02 |
| 2023/0182820 A1* | 6/2023 | Park | B62D 21/155 |
| | | | 180/68.5 |

FOREIGN PATENT DOCUMENTS

| | | |
|---|---|---|
| FR | 2962400 A1 | 1/2012 |
| FR | 2984838 A1 | 6/2013 |
| WO | WO2012038659 A1 | 3/2012 |

* cited by examiner

ENGINE CRADLE FOR A MOTOR VEHICLE

The present disclosure concerns a support device of an engine support structure of a motor vehicle. The disclosure further relates to an engine support structure of a motor vehicle comprising at least one such support device and to a method for producing such a support device.

BACKGROUND

Such a support device is for example known as an engine cradle. The engine cradle supports the powertrain, suspension elements and other devices such as the anti-roll bar. It is submitted to repetitive mechanical loading and is also involved in the incidental load cases linked to events concerning the suspension. As such, it needs to meet demanding load cases in fatigue, rigidity and incidental loading.

The engine cradle is commonly made of an upper and lower shell connected together to delimit a hollow interior volume.

In recent years, vertical fixation devices, for example known as fixation horns, have been introduced to act simultaneously as fixation elements between the front of the engine cradle and the rest of the vehicle body and as mechanical spacers between the upper and lower shell of the cradle. By integrating several functions, the fixation horn allows lowering the assembling complexity and can be advantageous in terms of vehicle weight reduction and manufacturing productivity.

Because of the presence of numerous parts in the vicinity of the fixation horn and due to its multiple functions as fixation element and mechanical spacer, the fixation horn necessarily has a complex shape consisting of a fixation part, often bent to accommodate for the anti-roll bar or other neighbouring devices, protruding from the support device to the part on which the support device is mounted to the rest of the vehicle structure, and a base part, which needs to have a sufficiently large surface to act efficiently as spacer between the upper and lower shell of the engine cradle and to withstand the mechanical load coming from the weight of the support device and the elements that it supports.

In order to obtain such a complex shape, it is known from the prior art to produce the fixation device in one integral part by metal molding. In other words the fixation part and the base part of the fixation device are portions of the same single part obtained by metal molding in one single molding cavity. The same part cannot be produced directly in one single part using other manufacturing processes such as bending, stamping or tube forming.

However, there are several limitations associated to metal molding such as for example low productivity, high costs, lack of freedom to design the part because of the constraints imposed by the demolding step, lack of freedom to adapt the part design to different environments due to the fact that the mold cannot be easily modified, lack of freedom in the choice of suitable material because only a limited number of materials can be used for molding. As a result the obtained fixation device has limitations in terms of mechanical characteristics, shape and material choice. For example, the part cannot be advantageously made of steel, because it would have a prohibitively high weight.

Document FR-2 962 400 discloses a fixation device made of two parts, each comprising a base portion, extending in the hollow volume of the support part, and a fixation portion protruding from the support part, the base portion and the fixation portion being integral. Consequently, the base portion cannot be designed independently from the fixation portion.

SUMMARY

One of the aims of the present disclosure is to overcome these limitations by providing a support device, which can easily be mass produced and can offer high flexibility in the choice of materials used, the shape of the fixation device and the possibility to adapt the fixation device to different environments.

To this end the present disclosure provides a support device of an engine support structure of a motor vehicle comprising at least a support part, comprising an upper face and a lower face defining between them a hollow volume, and at least one fixation device intended to attach the support part to a vehicle body, wherein the fixation device comprises a fixation part and a base part extending at least partially inside the hollow volume of the support part, at least a portion of the upper face and at least a portion of the lower face being applied against at least a portion of the base part on either side of said base part, wherein the fixation part and the base part are formed of at least two distinct parts attached together, the fixation part being attached to a lower end portion of the base part, said lower end portion extending in the hollow volume, the base part comprising an upper end portion protruding from the support part.

By producing the fixation device in at least two distinct parts, the fixation device no longer has to be molded, therefore giving more freedom in terms of material choice, shape and production methods.

According to other optional features of the support device according to the present disclosure, considered alone or according to any possible technical combination:

- the height separating an upper periphery of the base part from a lower periphery of the base part is substantially equal to the distance separating the upper face and the lower face of the support part along at least part of the base part,
- the base part comprises a proximal end portion attached to the fixation part and a distal end portion, opposite to said proximal end portion, said distal end portion being attached on either side thereof to the upper face and lower face of the support part,
- the fixation part is formed of a tubular part protruding from the support part and intended to extend from said support part to a portion of the body of the motor vehicle,
- the proximal end portion of the base part extends inside a lower end portion of the tubular fixation part and is attached to at least one wall of said tubular fixation part,
- the fixation device comprises at least a first base part protruding from the fixation part along a first radial direction and a second base part protruding from the fixation part along a second radial direction, the first radial direction and the second radial direction forming a non-zero angle (a) between each other,
- said first base part is attached to the tubular fixation part in a first area of said fixation part, said second base part) being attached to the tubular fixation part in a second area of said fixation part, said second area being distinct from said first area, the first base part and the second base part being further attached to the tubular fixation part in a common area, distinct from the first area and the second area, said first area, second area and common area comprise a notch in the lower end portion of the fixation part, said first base part and said second base part extending through said notches, the proximal end portions of the first base part and of the second base part receive between each other a socket to attach the fixation device to the support part, the base part is attached to the fixation part by welding along at least one weld seam, said weld seam extending along a direction substantially parallel to the axis of a lower end portion of the fixation part, and the fixation part and base part are made of steel.

The present disclosure also provides an engine support structure for a motor vehicle comprising at least one support device as described above.

The present disclosure further provides a method for producing the support device as described above comprising the steps of:

providing at least one fixation part,
providing at least one base part,
assembling together said fixation part and said base part to form a fixation device,
positioning said base part inside the hollow volume of a support part,
assembling said fixation device to said support part by at least attaching the base part of the fixation device to the support part.

According to other optional features of the method according to the present disclosure, considered alone or according to any possible technical combination:

the step of assembling the fixation part and the base part comprises welding of the base part to a lower end portion of the fixation part, the weld seams created during said step of assembling are all rectilinear extending along a single direction substantially parallel to the axis of said lower end portion, the fixation part is made by forming a metallic tube,
the base part is made by forming a metallic sheet, and
the base part and the support part are assembled through mechanical joining.

BRIEF SUMMARY OF THE DRAWINGS

Other aspects and advantages of the present disclosure will appear upon reading the following description, given by way of example, and made in reference to the appended drawings, wherein.

DETAILED DESCRIPTION

In the following description, the terms "upper", "lower", "front", "rear", "transverse", "longitudinal" are defined according to the usual directions of a mounted vehicle. More particularly, the terms "upper" and "lower", are defined according to the elevation direction of the vehicle, the terms "front", "rear" and "longitudinal" are defined according to the front/rear direction of the vehicle and the term "transverse" is defined according to the width of the vehicle. By "substantially parallel" or "substantially perpendicular" it is meant a direction which can deviate from the parallel or perpendicular direction by no more than 10°.

Figure 1:
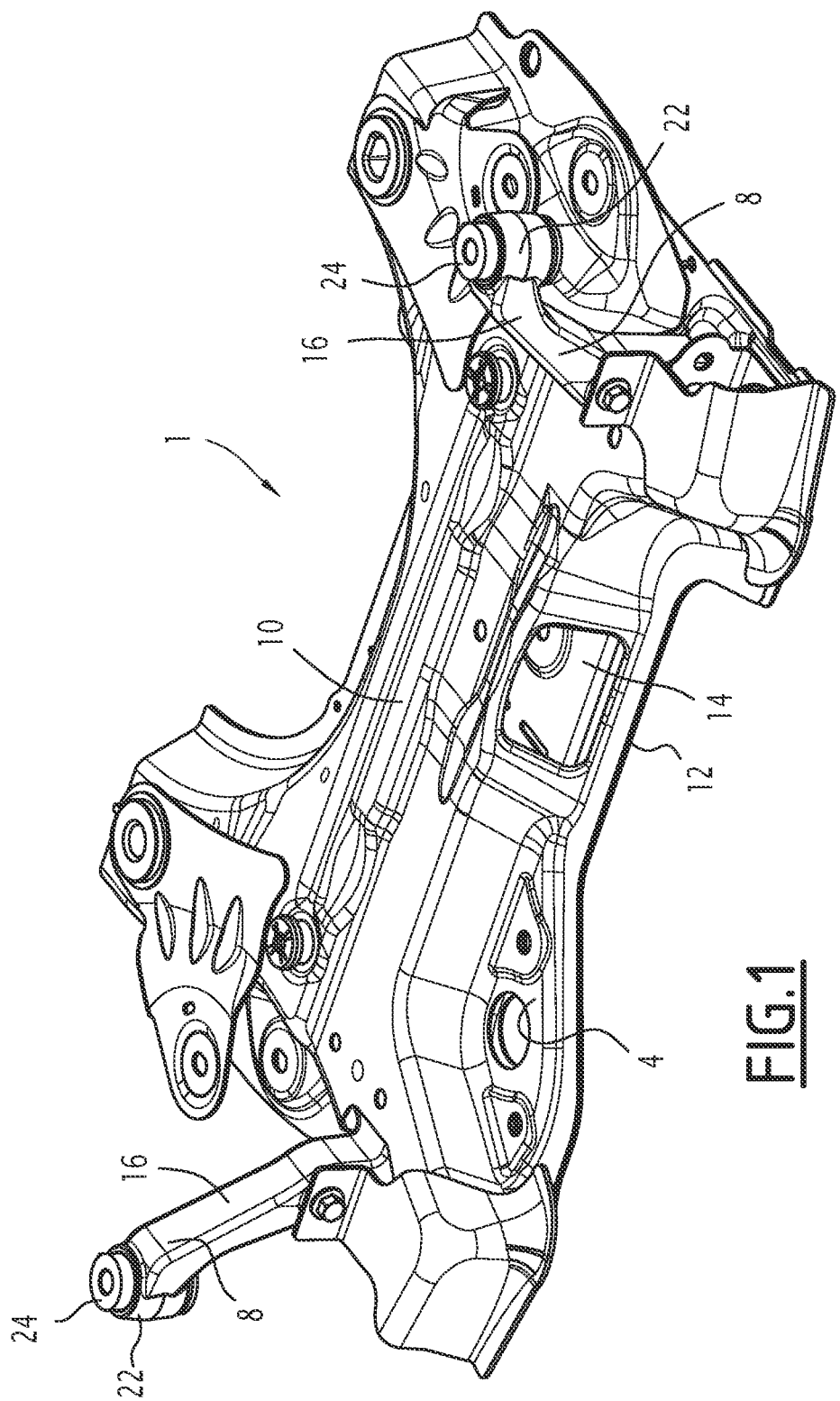
FIG. 1 is an overall perspective view of a support device according to an embodiment of the present disclosure.
Figure 2:
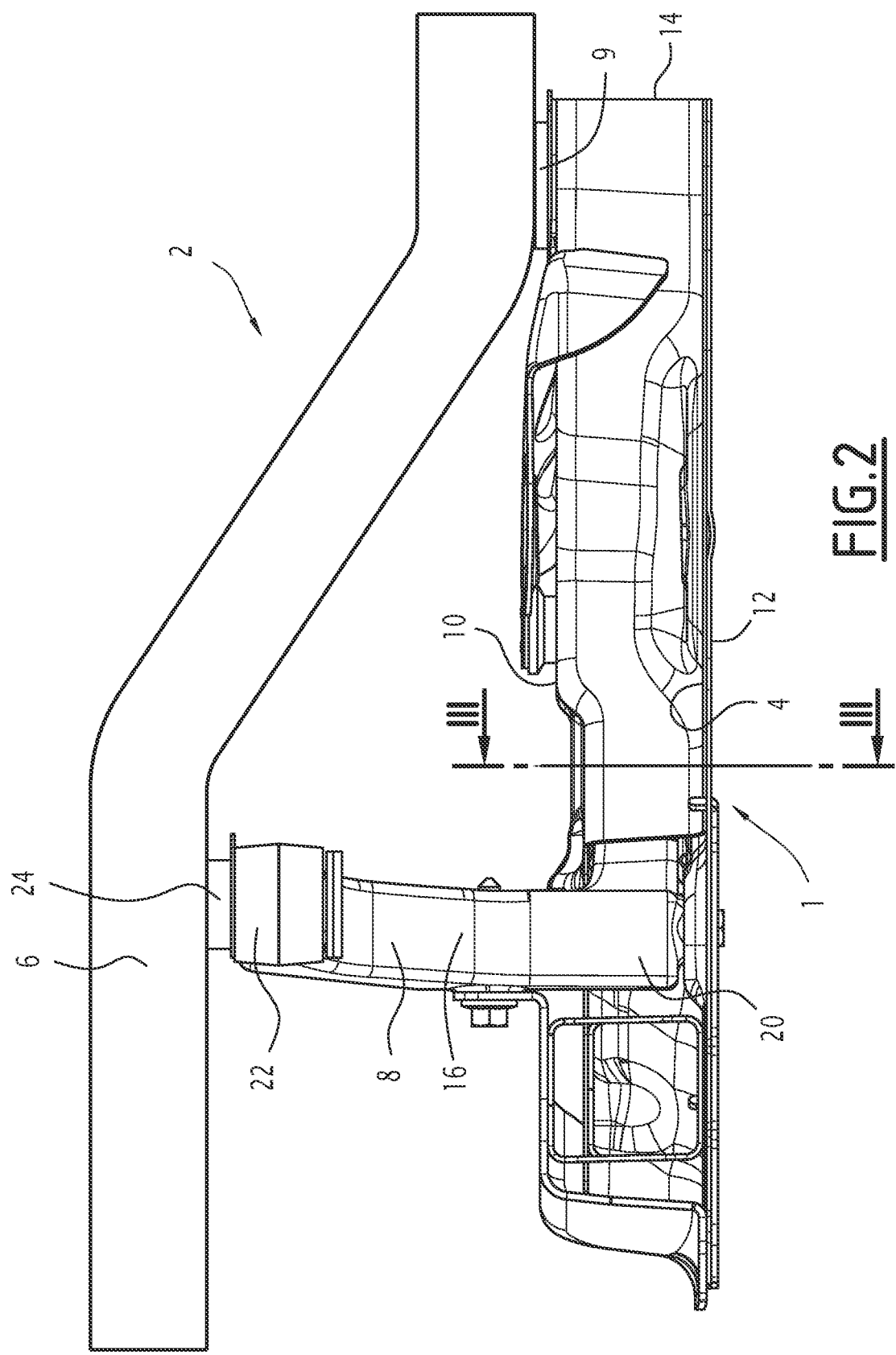
FIG. 2 is a side view of the support device of FIG. 1, integrated in an engine support structure according to an embodiment of the present disclosure.

Referring to FIG. 1 and FIG. 2, a support device 1 of an engine support structure 2 of a motor vehicle is described. The support device 1 comprises a support part 4, attached to at least one longitudinal side member 6 of the engine support structure 2 via at least one fixation device 8. More generally, the support device 1 may be attached to any part of the body of the vehicle at least through the fixation device 8. According to the embodiment shown in FIG. 1, the support part 4 is attached to two longitudinal side members 6 through two fixation devices 8, for example located on either side in the transverse direction of the support part 4. The support part 4 can also be further attached to the longitudinal member 6 through fastening areas 9 located on the opposite end of the support part 4 along the longitudinal direction as shown in FIG. 2.

Figure 3:
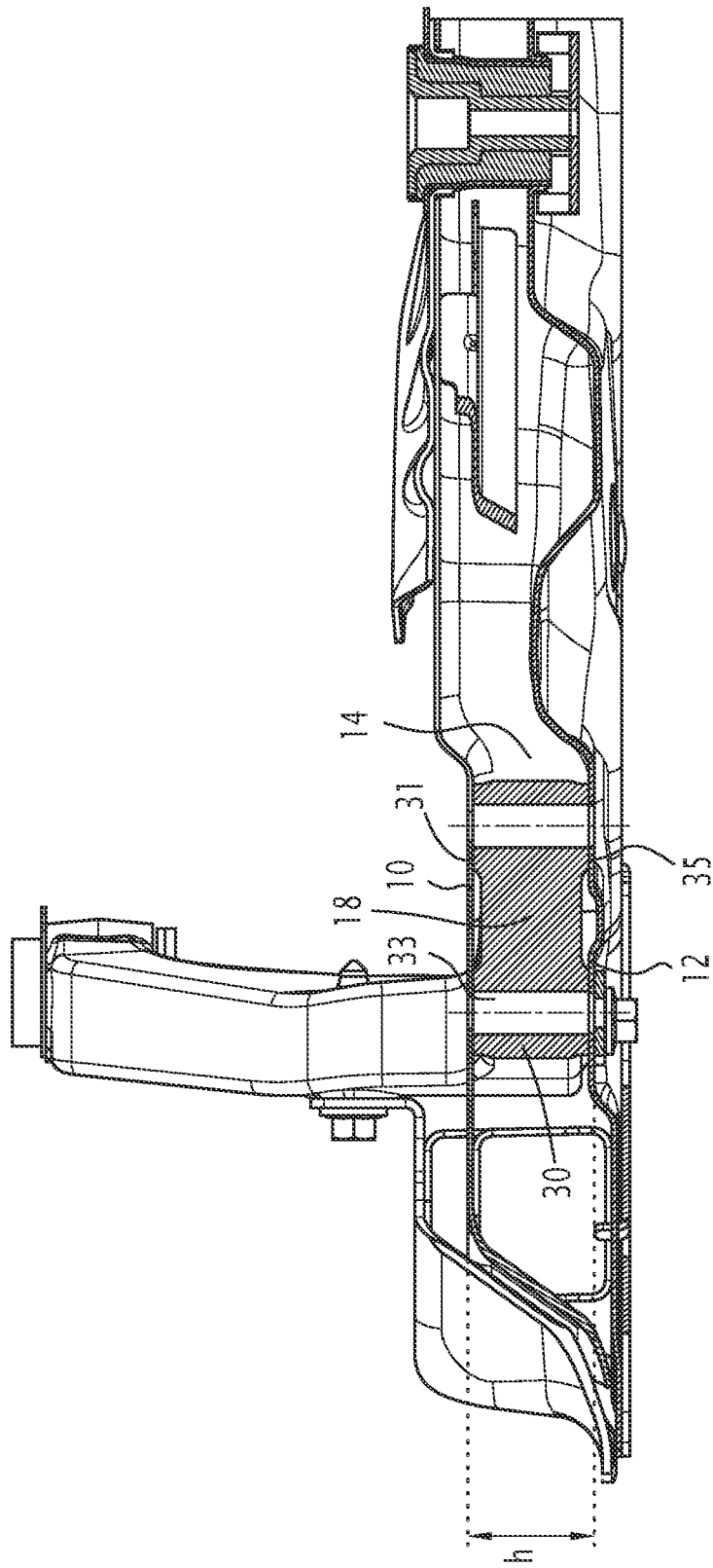
FIG. 3 is a cross section view along axis of FIG. 2.

The support part 4 comprises an upper face 10 and a lower face 12. As shown in FIG. 3, the upper face 10 and the lower face 12 define between them a hollow volume 14. The support part 4 is intended to act as a support for at least part of the suspension of the vehicle. The support part 4 can also act as a support for the engine of the motor vehicle. The support part 4 is for example known as an engine cradle. The support part 4 can be located in the front compartment and/or the rear compartment of the motor vehicle. The upper face 10 and lower face 12 are for example each formed by stamping from a metal sheet.

Figure 4:
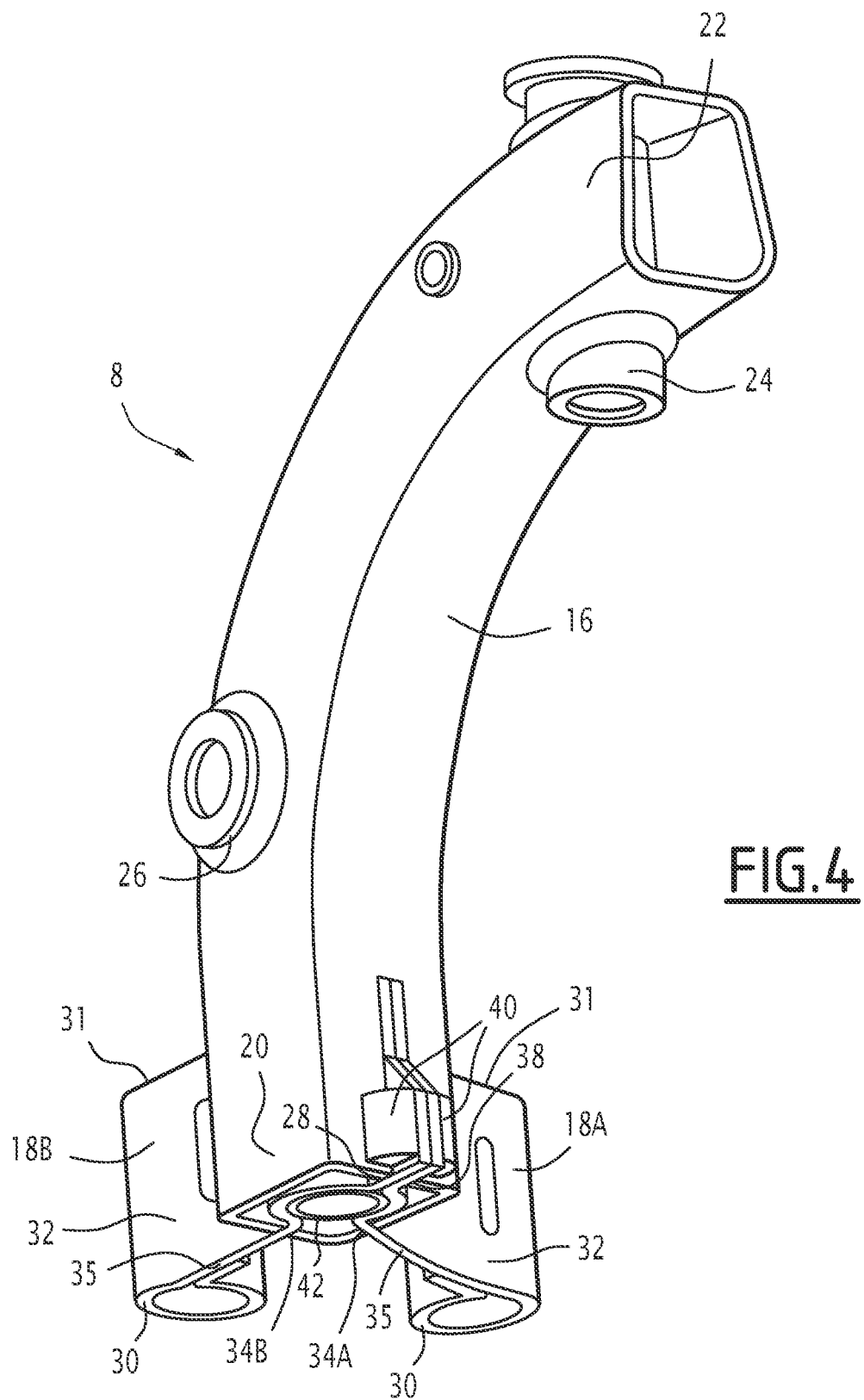
FIG. 4 is a side perspective view of a fixation device of the support device of FIG. 1.
Figure 5:
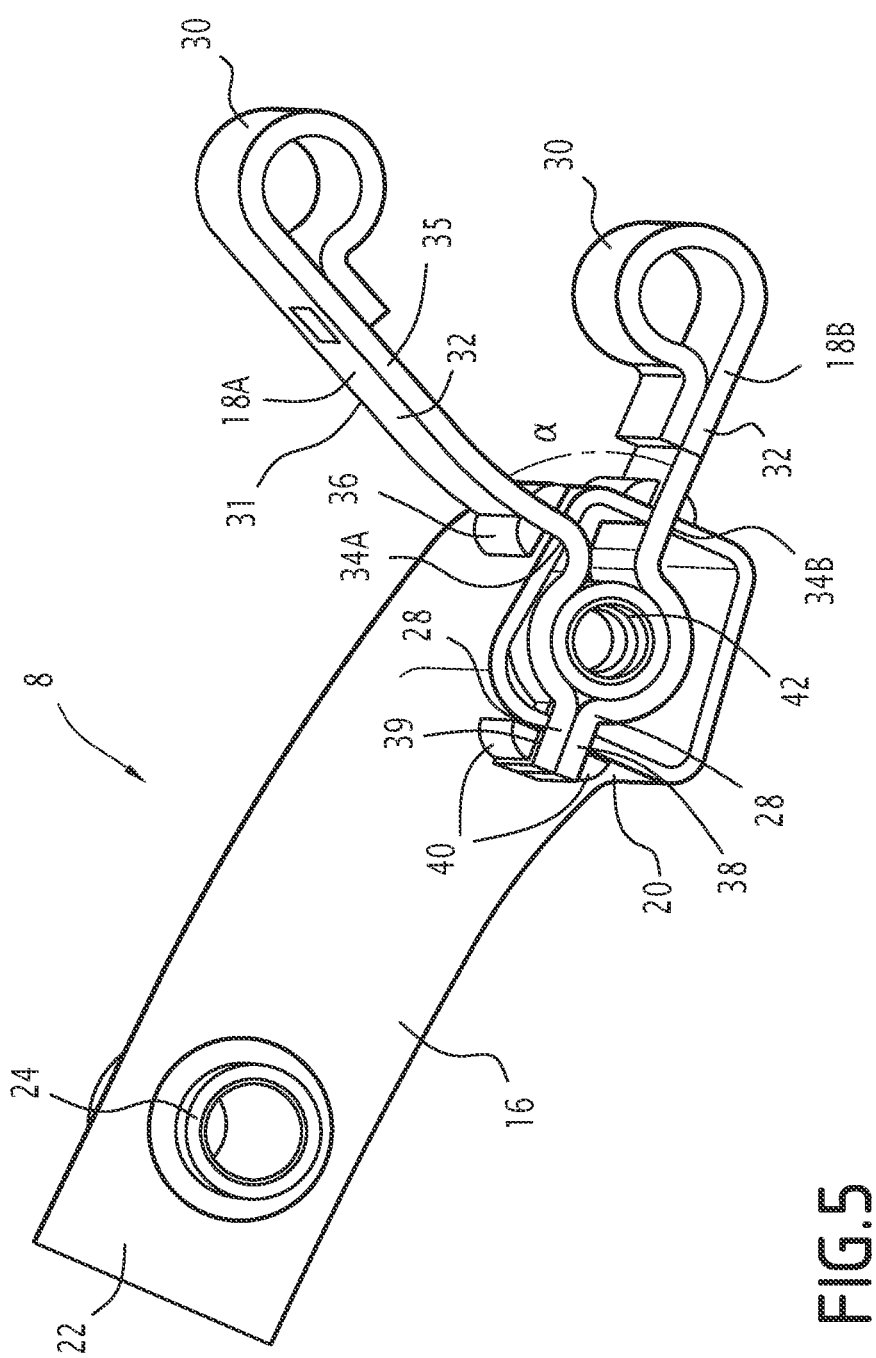
FIG. 5 is a bottom perspective view of the fixation device of FIG. 4.

Referring to FIGS. 4 to 5, the fixation device 8 comprises a fixation part 16, attaching the support device 1 to the longitudinal side member 6, and at least one base part 18, extending at least partially inside the hollow volume 14. The fixation part 16 and the base part 18 are two distinct parts attached together as will be described in greater detail subsequently.

The fixation part 16 protrudes from the support part 4 between a lower end portion 20 and an upper end portion 22 generally along the elevation direction. The upper end portion 22 protrudes from the support 4 and the lower end portion 20 extends in the hollow volume 14 of the support 4.

The shape of the fixation part 16 is adapted to the environment in which the support device is integrated in the motor vehicle. The fixation part 16 has for example the shape of a horn, to accommodate for the presence of other mechanical elements in the area. According to a particular embodiment, the fixation part 16 is bent outwardly according to the transverse direction between the lower end portion 20 and the upper end portion 22. According to an embodiment, the fixation part 16 is a hollow metallic tubular part. For example the fixation part 16 is a steel tubular part. For example, the fixation part 16 is a tubular part of trapezoidal cross-section. According to other variants, the cross section of the tubular part can be circular or any other adapted shape. It should be noted that said cross-section can vary along the elevation direction to further accommodate for the presence of mechanical elements in the area. The cross section is arranged to confer a desired inertia and rigidity to the fixation part 16 more particularly to sustain a pre-defined set of mechanical characteristics. While a tubular shape is advantageous to achieve said inertia and rigidity, it should also be noted that the fixation part 16 could also be made from a metallic rod or a metallic sheet.

The upper end portion 22 of the fixation part 16 can be fastened to the longitudinal side member 6 via a mechanical fastening element, such as a screw and with the possible adjunction of a silent bloc to the fastening in order to filter out the vibrations coming from the suspension and the engine. To receive the mechanical fastening element a socket 24 extends through the upper end portion 22 of the fixation part 16, for example along the elevation direction. It should be noted that other fixation methods, such as welding, are possible to attach the fixation part 16 to the longitudinal side member 6. It should also be noted that other fixation elements can extend through the fixation part 16. For example, as shown in FIG. 4, the fixation part 16 receives a socket 26, extending in the longitudinal direction and located in a central portion extending between the upper end 22 and the lower end 20, to attach a support for an anti-roll bar of the motor vehicle.

The base part 18 comprises a proximal end portion 28, a distal end portion 30 and a central portion 32 linking both the proximal end portion 28 and the distal end portion 30. The proximal end portion 28 is attached to the lower end portion 20 of the fixation part 16. The central portion 32 extends in a radial direction from the lower end portion 20 of the fixation part 16 at least partially inside the hollow volume 14 such that the distal end portion 30 is located inside said hollow volume 14 at a distance from the lower end portion 20 of the fixation part 16. By radial direction it is meant a direction extending from the lower end portion 20 of the fixation part 16 and which is substantially perpendicular to the axis of said lower end portion 20. The base part 18 further comprises an upper periphery 31, representing the surface which forms the thickness of the base part 18 on its upper side and a lower periphery 35, representing the surface which forms the thickness of same base part 18 on its lower side. The height h designates the distance separating the upper and lower peripheries 31 and 35, measured along the elevation direction.

The base part 18 acts as a mechanical spacer between the upper face 10 and the lower face 12 of the support part 4. In other words, at least a portion of the upper and lower faces 10 and 12 of said support part 4 are applied respectively against at least a portion of the upper and lower peripheries 31 and 35 of said base part 18 as shown in FIG. 3. In other words, the distance separating the upper and lower faces 10 and 12 in the area of the hollow volume 14 in which the base part 18 is inserted is equal to the height h along at least a portion of the base part 18. More specifically, the mechanical spacer function is performed by at least a portion of the central portion 32 and/or at least a portion of the distal end portion 30 of the base part 18. In other words, the base part 18 acts to increase the rigidity of the support part 4 thereby preventing the hollow volume 14 from collapsing onto itself.

It should be noted that the central portion 32 and/or the distal end portion 30 of the base part 18 are not necessarily applied entirely to the upper face 12 and lower face 10 of the support part 4 and that the height of said central portion 32 and/or of said distal end portion 30 and/or the distance separating said upper face 12 from said lower face 10 may vary. According to an embodiment, the mechanical spacer function is performed by the whole central portion 32 and distal end portion 30 of the base part 18, meaning that said central portion 32 and distal end portion 30 are in contact all along the radial direction with the upper face 12 and the lower face 10 of the support part 4. In this case the rigidity of the support part 4 is further improved by increasing the contact length between the base part 18 and the upper and lower faces 10, 12 of said support part 4.

According to an embodiment, the base part 18 also acts as a fastening device between the fixation device 8 and the support part 4. To this end, the distal end portion 30 and/or the central portion 32 are fastened to the upper face 10 and the lower face 12 of said support part 4. In an embodiment, the base part 18 is welded to the support part 4 along at least a portion of the central portion 32 and/or of the distal end portion 30. According to another embodiment, the base part 18 is mechanical fastened to the support part 4, in which case the distal end portion 30 is for example shaped to accommodate a mechanical fastening element such as a socket 33, to attach the distal end portion 30, on either side thereof, to the upper face 10 and the lower face 12, as more particularly visible in FIG. 3.

The base part 18 and the fixation part 16 of the fixation device 8 are separate parts, attached together through the lower end portion 20 of the fixation part 16 and the proximal end portion 28 of the base part 18. More particularly said proximal end portion 28 and said lower end portion 20 are attached together in at least one area for example by welding. In the embodiment where the fixation part 16 is a tubular part, the proximal end portion 28 of the base part extends inside the lower end portion 20 and is attached to at least one wall of said tubular fixation part 16. According to an embodiment, said wall comprises a notch 34A, 34B extending through said wall in the elevation direction and designed to receive the proximal end portion 28. Said proximal end portion is inserted through said notch 34A, 34B and is fastened to said lower end portion 20 by means of weld seams 36 extending in the elevation direction on either side of the notch 34A, 34B. In this embodiment, the use of a notch to fasten the base part 18 advantageously ensures an easy positioning and an automatic orientation of the base part 18 relative to the fixation part 16. Furthermore, in this embodiment the weld seams extend in a direction substantially parallel to the main load applied to the fixation device 8, thereby advantageously ensuring a robust assembly between the base part 18 and the fixation part 16. Indeed if the weld seams were to extend in a direction substantially perpendicular or inclined to the main load applied to the fixation device 8, the weld seams would be subjected to shear forces, which would make the assembly more fragile, thereby requiring a significantly higher length of weld seam to ensure the same robustness as in the embodiment described above.

According to an embodiment and as shown in FIGS. 4 and 5, the fixation device 8 comprises at least two base parts 18, for example a first base part 18A and a second base part 18B. In this embodiment, the presence of multiple parts improves the mechanical spacer function of the base parts 18 by increasing the contact length between the upper face 10 and the lower face 12 of the support part 4 and the base parts 18. In a particular embodiment, first base part 18A protrudes from the lower end portion 20 of the fixation part 16 along a first radial direction and the second base part 18B protrudes from said lower end portion 20 along a second radial direction, the first radial direction and the second radial direction forming a non-zero angle α between each other, as can be seen on FIG. 5. In this case, the fixation device 8 is fastened to the support part 4 in several angularly offset areas, advantageously conferring robustness to the assembly whatever the direction of the load applied to the support device 1. It should be understood that there can be more than two base parts 18, for example evenly distributed around said lower end portion 20, thereby further improving the mechanical spacer and fastening performances of the base parts 18. Furthermore, it should also be noted that the length of the base parts 18 according to their radial direction is not necessarily the same for each base part 18, according to the environment around the fixation device 8.

According to an embodiment, the first base part 18A is attached to the lower end portion 20 of the tubular fixation part 16 in a first area for example through a first notch 34A. The second base part 18B is attached to the lower end portion 20 in a second area for example through a second notch 34B. Said second area is distinct from said first area, the first notch and second notch for example extending through separate walls of said lower end portion 20 as shown in FIGS. 4 and 5. The first base part 18A and the second base part 18B are further attached to the lower end portion 20 in a common area 38 distinct from the first area and the second area. The common area 38 comprises a common notch 39, which is designed to accommodate the proximal end portions 28 of both base parts 18A and 18B. Advantageously, this common area 38 allows to attach both base parts 18A and 18B together and to the lower end portion 20 in a single area with the same welding seams 40 as shown in FIGS. 4 and 5. It should also be noted that a common area 38 can also be created in the case where there are more than two base parts 18.

According to an embodiment, more particularly visible in FIG. 5, the shapes of the proximal end portions 28 of the first base part 18A and of the second base part 18B are designed to receive between each other a socket 42. Said socket 42 allows to further fasten the fixation device 8 to the support part 4 in an area which is comprised inside the lower end portion 20 of the tubular fixation part 16. Advantageously, the presence of a mechanical fastening element in said area confers a higher strength to the assembly without increasing the space requirement.

The support device described above, comprising a fixation device made of at least two distinct parts, presents multiple advantages compared to a support device comprising a molded fixation device: freedom of choice in the design of the fixation device and in the choice of materials, possibility to easily adapt the shape of the fixation part to different environments, light weight, thanks to an optimized shape of the base part.

The use of very productive manufacturing processes compared to metal molding is another advantage of the present disclosure, as will be seen through the description of the method for producing the above described support device. The method comprises a step of providing at least one fixation part 16. For example, the fixation part 16 is made by forming a hollow metallic tube into the appropriate shape by forming the section using a mandrel, by further bending the tube and by piercing holes and notches 34A, 34B in the appropriate areas.

The method further comprises a step of providing at least one base part 18. For example, the base part 18 is made by stamping and/or bending a metallic sheet. Further processing can also include welding the closed distal end portion 30 on itself in order to shape it so as to receive a socket 33.

The method further comprises an assembly step to join together said fixation part 16 and said base part 18 to form a fixation device 8, for example by inserting the base part 18 inside the corresponding notch 34A, 34B and by forming weld seams 36 on either sides of said notch 34A, 34B. In the case where there are at least two base parts 18, this assembly step can also comprise for example a step of welding together the base parts 18 in a common area 38 using the same weld seams 40. It should be noted that the welding operations are made easier if for example the weld seams extend in the elevation direction, thanks to the good accessibility of the fastening areas to the welding tools, and thanks to the freedom of movement of said welding tools along the fastening areas. Indeed, the weld seam extending in only one direction, the movement of the welding head is limited to a one direction translation, and does not involve more complex movements such as rotation or movement along two distinct axes.

When needed, the fixation device 8 is further equipped with the appropriate sockets.

Once the fixation device 8 is thus obtained, the method further comprises a step of positioning the base part(s) 18 of the fixation device 8 inside the hollow volume 14 of the support part 4.

The fixation device 8 is then fastened to the support part 4 to obtain a support device 1, for example by mechanical joining through the pre-positioned sockets located in the distal end portion(s) 30 of the base part(s) 18 and inside the lower end portion 20 of the tubular fixation part 16.

The support device 1 is then integrated in the engine support structure of the motor vehicle by fastening it to the longitudinal member(s) 6 through the fixation device(s) 8 and possibly through other fastening area(s) 9 located on the opposite end of the support part 4 in the longitudinal direction.

What is claimed is:

1. A support device of an engine support structure of a motor vehicle comprising:
    at least a support part comprising an upper face and a lower face defining between them a hollow volume; and
    at least one fixation device configured to attach the support part to a vehicle body,
    the fixation device comprising a fixation part and a base part extending at least partially inside the hollow volume of the support part, at least a portion of the upper face and at least a portion of the lower face being applied against at least a portion of the base part on either side of the base part,
    the fixation part and the base part being formed of at least two distinct parts attached together, the fixation part being attached at its lower end portion to the base part, the lower end portion extending in the hollow volume, the base part comprising an upper end portion protruding from the support part.

2. The support device according to claim 1, wherein a height separating an upper periphery of the base part from a lower periphery of the base part is substantially equal to the distance separating the upper face and the lower face of the support part along at least part of the base part.

3. The support device according to claim 1, wherein the base part comprises a proximal end portion attached to the fixation part and a distal end portion, opposite to the proximal end portion, the distal end portion being attached on either side thereof to the upper face and lower face of the support part.

4. The support device according to claim 1, wherein the fixation part is formed of a tubular part protruding from the support part and configured to extend from the support part to a portion of the body of the motor vehicle.

5. The support device according to claim 4, wherein the base part comprises a proximal end portion attached to the fixation part and a distal end portion, opposite to the proximal end portion, the distal end portion being attached on either side thereof to the upper face and lower face of the support part, wherein the proximal end portion of the base part extends inside a lower end portion of the tubular fixation part and is attached to at least one wall of the tubular fixation part.

6. The support device according to claim 1, wherein the fixation device comprises at least a first base part protruding from the fixation part along a first radial direction and a second base part protruding from the fixation part along a second radial direction, the first radial direction and the second radial direction forming a non-zero angle between each other.

7. The support device according to claim 6, wherein the base part comprises a proximal end portion attached to the fixation part and a distal end portion, opposite to the proximal end portion, the distal end portion being attached on either side thereof to the upper face and lower face of the support part, wherein the fixation part is formed of a tubular part, wherein the proximal end portion of the base part extends inside a lower end portion of the tubular fixation part and is attached to at least one wall of the tubular fixation part, wherein the first base part is attached to the tubular fixation part in a first area of the fixation part, the second base part being attached to the tubular fixation part in a second area of the fixation part, the second area being distinct from the first area, the first base part and the second base part being further attached to the tubular fixation part in a common area, distinct from the first area and the second area.

8. The support device according to claim 7, wherein the first area, second area and common area comprise a notch in the lower end portion of the fixation part, the first base part and the second base part extending through the notches.

9. The support device according to claim 6, wherein the base part comprises a proximal end portion attached to the fixation part and a distal end portion, opposite to the proximal end portion, the distal end portion being attached on either side thereof to the upper face and lower face of the support part, wherein the fixation part is formed of a tubular part, wherein the proximal end portion of the base part extends inside a lower end portion of the tubular fixation part and is attached to at least one wall of the tubular fixation part, wherein the proximal end portions of the first base part and of the second base part receive between each other a socket to attach the fixation device to the support part.

10. The support device according to claim 1, wherein the base part is attached to the fixation part by welding along at least one weld seam, the weld seam extending along a direction substantially parallel to the axis of a lower end portion of the fixation part.

11. The support device according to claim 1, wherein the fixation part and base part are made of steel.

12. An engine support structure of a motor vehicle comprising:
   at least one of the support device according to claim 1; and
   at least one longitudinal side member, the fixation device of the support device being attached to the longitudinal side member.

13. A method for producing the support device according to claim 1, comprising the steps of:
   providing the fixation part;
   providing the base part;
   assembling together the fixation part and the base part to form the fixation device;
   positioning the base part inside the hollow volume of the support part; and
   assembling the fixation device to the support part by at least attaching the base part of the fixation device to the support part.

14. The method according to claim 13, wherein the fixation part is made by forming a metallic tube.

* * * * *